United States Patent [19]

Ellerstorfer et al.

[11] 4,362,126
[45] Dec. 7, 1982

[54] BIRD SHOWER

[76] Inventors: Herbert Ellerstorfer, Bismarckstrasse 133, 8500 Nürnberg; Leopold Anetseder, Arnoldstrasse 13, 8000 München, both of Fed. Rep. of Germany

[21] Appl. No.: 142,158

[22] Filed: Apr. 21, 1980

[51] Int. Cl.³ .................................... A01K 29/00
[52] U.S. Cl. ................................ 119/1; 119/159
[58] Field of Search ............... 119/1, 74, 76, 158, 119/159

[56] References Cited

U.S. PATENT DOCUMENTS

| | | | |
|---|---|---|---|
| 1,152,706 | 9/1915 | Clark | 119/159 |
| 1,342,776 | 6/1920 | Sundre | 119/159 |
| 1,505,641 | 8/1924 | Hendrickson | 119/159 |
| 2,524,641 | 10/1950 | Suttles, Jr. | 119/159 |
| 2,938,495 | 5/1960 | Hinton | 119/1 |

FOREIGN PATENT DOCUMENTS

| | | | |
|---|---|---|---|
| 202890 | 8/1956 | Australia | 119/159 |
| 774557 | 5/1957 | United Kingdom | 119/1 |
| 805490 | 12/1958 | United Kingdom | 119/1 |

*Primary Examiner*—Paul J. Hirsch
*Assistant Examiner*—Robert P. Swiatek
*Attorney, Agent, or Firm*—Holman & Stern

[57] ABSTRACT

A bird-shower-bath comprising a shower-head positioned over a bottom portion which serves both as a water-collector and reservoir. A pump, when operative, transfers water from the bottom portion to the shower-head; the pump being made operative by a switch which is in turn actuated by the movement of a movable platform or tub. In use, contact by a bird with the movable platform is sufficient to actuate the mechanism.

29 Claims, 6 Drawing Figures

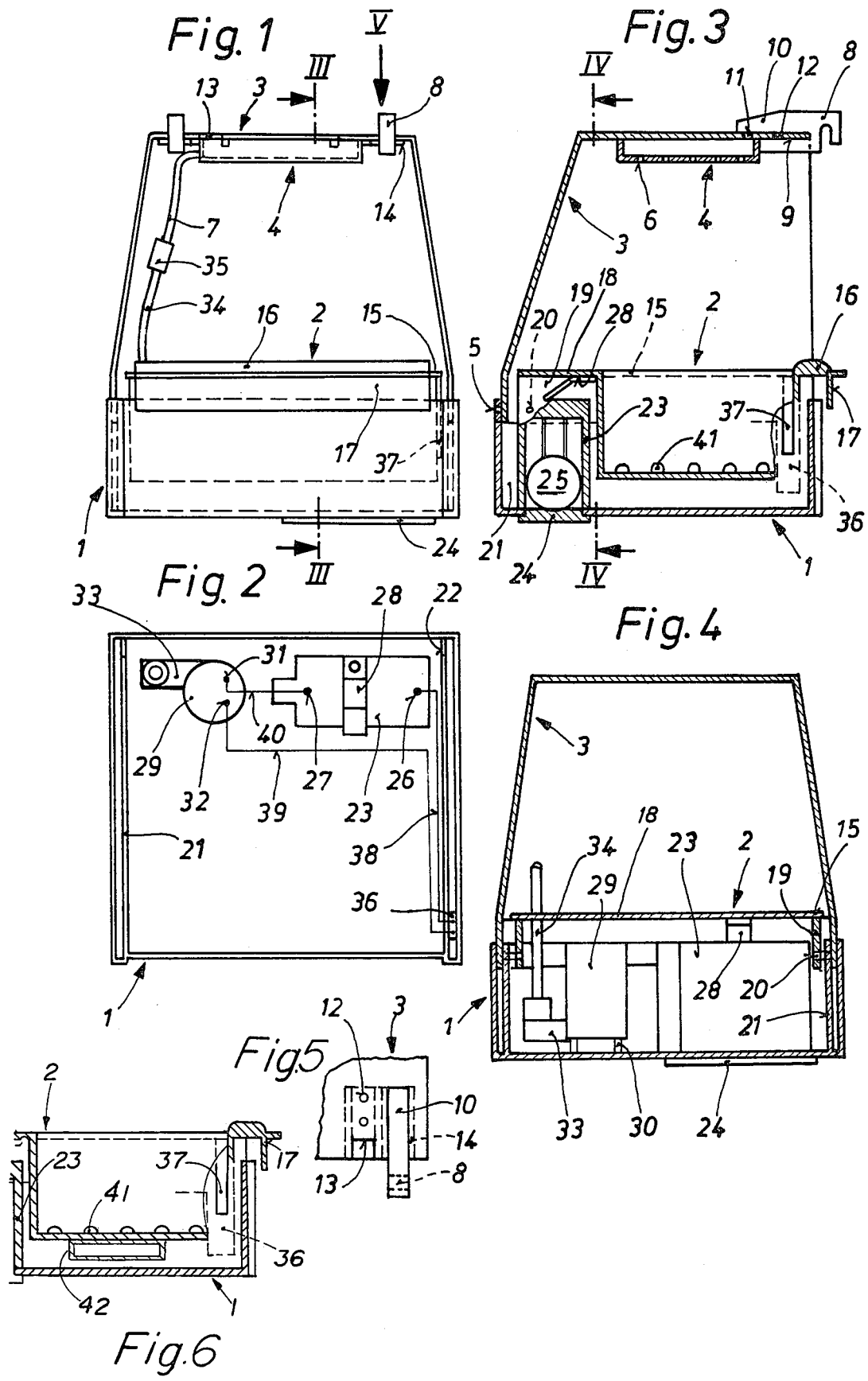

BIRD SHOWER

BACKGROUND OF THE INVENTION

1. Field of the Invention

The present invention concerns a shower-bath for birds in which a shower head, of a type which can be switched on and off, is arranged above a bottom portion and connected to a water reservoir.

2. Description of the Prior Art

Some birds which, for example, are kept in bird cages, enjoy spraying themselves with water. A bird shower-bath is necessary for this purpose. In a conceivable design of such a shower-bath for birds, a water reservoir is arranged above the shower head, and a valve is arranged in the water pipe between the water reservoir and the shower head, whereby the valve is manually operated. The water supplied by the shower head runs from a bottom portion, on which the bird is perched, into a collector. Such a structure has the disadvantage that the bird will not be able to turn the shower-bath on and off by himself. It is also necessary in such a prior art arrangement to continuously fill the water reservoir and to empty the collector.

SUMMARY OF THE INVENTION

It is an object of the present invention to provide a shower-bath for birds of the above-mentioned type, in which the bird is able to turn the water-circulation on and off by himself. The instant invention solves this problem by means of a bird bath which is characterized in that a seat arrangement or platform is positioned on the lower portion, whereby the seat is downwardly movable by means of a spring arrangement, and wherein the movement of the seat activates an electrical switch which is operatively positioned between an electric battery and an electric pump. The pump is operatively mounted between the shower head and a box-shaped lower portion which is open at the top and serves as a water reservoir.

DESCRIPTION OF THE PREFERRED EMBODIMENTS

In the present inventive shower-bath for birds, a predetermined supply of water is contained in the lower portion. When the pump is turned on by means of the switch, water is supplied from the lower part to the shower head, and, subsequently, the water is again returned to the lower portion, i.e., to the water reservoir. This water-cycle is activated by the weight of the bird sitting or standing on the seat, and is switched off when the bird leaves the seat. The weight of the bird causes the seat to move downwards to some extent, wherby the switch is turned on. When the bird moves away, the seat moves upwards. In the instant case, the electric switch means, which is controlled by the movement of the seat portion, is of an especial advantage since the switch means can be effectively protected against moisture and dirt. The electrical operation of the bird shower-bath does not prevent its mounting on a bird cage since a battery is provided to supply the power.

In one embodiment, it is possible to arrange a floating member in the lower part of the water reservoir in order to provide the seat with a springiness, whereby the floating member pushes against the seat from below and in operation is pressed into the water by the weight of the bird against the upward force of the floating member. In a preferred embodiment, a spring action is provided by means of a mechanical spring. The mechanical spring provides consistent operation and is independent of the amount of water present or of the magnitude of the upward force.

It is also possible to construct and arrange the seat or perch and the associated spring means in a manner so that the seat is moved upwards and downwards in a vertical manner only. In a preferred embodiment the seat is substantially rectangular and is provided with openings, and is rotatably positioned near the rearward side about a horizontal axle, whereby the spring means is provided in the front of the axle. This structure produces a simple mounting and positioning of the seat in which the movement of the seat, which is required for the activation of the switch, can be obtained without any difficulties in the structuring of the spring. The openings serve as a drainage means for the water falling from the shower head into the lower portion of the box-shaped water reservoir.

The seat may be constructed, for example, as a grid. In a preferred embodiment the seat is constructed as a tub with openings near the bottom and a peripheral bridge at the upper edge which overlaps the box-shaped bottom portion. The box-shaped bottom portion is thereby effectively covered so that the legs of the bird are not endangered because of the slots or openings. The openings provided close to the bottom section of the tub permit the water to flow slowly from the walls of the tub into the bottom portion.

It is, furthermore, possible to set the water level in the lower portion to a height such that there will always be water present in the tub, so that the bird, while showering, is also able to take a bath. The mechanical spring arrangement which, for example, may be a plate or leap spring, is of such a dimension that when the bottom of the bath tub is flooded over with water, the tub or the seat portion are still secured in a rest position. Also, the force-conditions would then not be disturbed when there exists varying water levels above the bottom of the tub. This requires optimum openings or optimum reduction of the mass on the side walls of the drain-structure, so that only unimportant upward-forces, which depend on the level of the water, are effective.

It is also especially suitable and advantageous to have the seating arrangement contain a profiled seat-bar or perch extending along the front side. This seat bar assists the bird in landing. In the embodiment comprising a rotational or pivotable positioning of the seat, the seat is already positioned in the manner required for switching on the shower bath when the bird lands on the seat bar.

It is possible to mount the pump and the battery external to the bottom portion of the unit and adjacent thereto. A preferred embodiment however, is the arrangement wherein a water-tight chamber containing the battery and a water-tight housing containing the pump are arranged within the bottom portion. This embodiment saves space and provides a compact and essentially self-contained unit.

The electrical switch means may, for example, comprise a micro-switch which is activated by means of the upwardly-moving seat-arrangement, and which, on the basis of a time-relay, after a predetermined time period turn itself off. It is especially suitable and effective, however, that the switch means arranged on the bottom portion comprise a reed-relay and have closely arranged thereto a permanent magnet which is fastened to the seat portion. This switch arrangement permits operation over an extended time period free of interferences and functions continuously, and in a safe manner also with a short range of movement of the seat and with a bird having a low mass.

In a further embodiment, it is also possible to support the shower head on a stand above either the bottom portion or the bath tub. It is, however, especially suitable and advantageous when employing a housing which is open towards the front, to mount the shower head on the bottom portion. The housing thereby prevents the bird from splashing too much water out of the bird shower when showering and bathing. The housing in this embodiment is mounted on the bottom portion and not on the bath tub.

The housing may be fixedly connected with the bottom portion. It is especially suitable and advantageous, however, that the housing be releasably connected to the shower head by means of a connecting part located above the housing, whereby the housing, together with the shower head, are connectable with the bottom portion and the pump in a simple manner, and yet releasable from the bottom portion. This is an advantage not only for space-saving reasons but also for removal of the seat for cleaning purposes.

It is, furthermore, especially suitable and advantageous to have two separated, elongated hook pieces or hooks, provided on the frontal portion of the housing, which are pushed thereon by means of slots, and are releasably secured in at least two different positions by means of an elastic locking device. It is thereby possible to attach the bird shower-bath to bird cages having varying designs, since the two hooks each are able to project to the extent necessary in accordance with the particular design of the cage used. These hook pieces can also be used independent of the herein-described special structure.

In a further embodiment of the present invention, it is advantageous to have each of the hooks be releasably attached by means of an elastic locking device in at least two parallel positions facing in the direction of the frontal side. Thus, the possibilities for adapting the position of the hook pieces to the design of the bird cage to which the bird shower-bath is to be attached, are thereby increased.

The inventive bird shower-bath described herein is designed primarily for smaller birds, for example those weighing approximately 5 grams. It consists in general of a synthetic material, being generally water resistant and additionally having the elasticity required for the locking device. In a preferred embodiment of the instant invention, the prior art bird-bath housing has been replaced by a shower-bath housing. The seat portion of the bird shower represents a form of a rocker with which the shower may be turned on and off.

The drawing shows a preferred embodiment of the present invention, wherein:

FIG. 1 represents a front elevational view of the bird shower;

FIG. 2 is a top elevational view of the bottom portion of the bird shower according to FIG. 1;

FIG. 3 is a cross-sectional view according to Line III—III of FIG. 1;

FIG. 4 is a cross-sectional view according to Line IV—IV of FIG. 3; and

FIG. 5 is a top view according to arrow V in FIG. 1.

FIG. 6 is a lower portion of the sectional view shown in FIG. 3, showing a float biasing the bottom of the tub.

The bird shower-bath according to the drawing comprises in general a bottom portion 1, a bath-tub 2, a housing 3, and a shower head 4. The bottom portion 1 represents a box-like structure which is open at the top and into which the tub 2, also being open at the top, is hangingly arranged, and on the wall of which is placed the housing 3 which is open at the bottom as well as at the front. Housing 3 carries, on what may be considered the ceiling, a shower head 4. The housing 3 reduces from the bottom to the top in both width and depth, and at the lower portion thereof there is provided a U-shaped wall-strip where the wall runs precisely vertical. Outwardly projecting nubs 5 are provided on this lower wall strip, namely on the flanges as well as at the rear cross-bar. The nubs project into corresponding openings in the wall of bottom portion 1, these openings being positioned near the upper edge of the wall of the box-shaped bottom portion. In this manner, housing 3 and bottom portion 1 are easily separated and reassembled.

The shower head 4, which is attached to the flat horizontal roof portion of housing 3, by means of a glue for instance, represents a rectangular box which at its underside is provided with a plurality of boreholes 6. The shower head 4 is located substantially centrally above the opening of the bath tub 2 and is provided, in a horizontal direction, with an area having boreholes 6, which area is at least one half as large as the horizontal area of the opening, or the upper side portion of the tub 2. A piece of hose 7 is connected to the shower head 4, said hose leading downwardly within the housing 3, positioned near a rearward corner of the housing.

In the free frontal edge, the roof portion of the housing 3 carries two elongated hooks 8, arranged at a distance from one another and projecting to the front of the roof portion. Each of the hooks 8 is provided with a rearwardly open slot 9 into which is inserted the roof. The hook 8 is guided by two cross-pieces 14 provided at the underside of the roof, and can be pulled from the roof or can slide onto the roof to the extent required. The flange 10 which delimits the slot 9 at the top, carries at its underside a nub 11 which extends into one of at least two recesses 12 provided on the roof portion. The recesses are separated from one another, and at varying distances from the front edge of the roof, so that the hook piece is able to rest in one of at least two locked positions on the roof portion. The roof, also in the area at which the hook piece 8 is being pushed, is provided with an opening 13 towards the free edge so that the hook piece can be pushed onto the roof to a greater extent. The upper flange 10 is resiliently elastic so that the nub 11 is easily releasable from the recess 12, or can be locked into the same. At both sides of the front portion of the roof are provided two openings 13 located close to one another and having associated cross-pieces 14 and recess 12. The two hook pieces 8 can thus be easily attached in various positions to the roof of the housing 3, and this makes the instant invention adaptable to and useful in cages of different design.

The tub 2 is provided at the upper edge of its wall portion with a peripheral, outwardly projecting edge ridge 15, which carries at its front portion a seat or perch 16 on which the bird is able to land. At the frontal part of the edge ridge 15 is provided a downwardly directed bar 17 which overlaps the frontal wall of the bottom portion 1. The frontal wall of the bottom portion thus extends between the bar 17 and the frontal wall of the tub 2. The edge-ridge 15 forms at the rearward side of the tub 2 a rearwardly widening portion 18, which, at both lateral ends on the bottom side is supported by a support member 19 which is integral with the wall of the tub 2. Each support member 19 carries an outwardly projecting plug 20.

At a small distance from each of the two lateral walls of the bottom portion 1 is provided one each of a secondary wall member which extends from the front rearwards as well as to the bottom of bottom portion 1, leaving what is essentially a slot between each of the lateral walls and its associated, parallel secondary wall member 21. Each of these secondary wall members 21 is provided with a borehole, as is clearly seen in FIG. 4, in which each of the two plugs 20 is rotatably positioned. Between the secondary wall member 21 and the associated lateral wall of the bottom portion 1 extends also the lower wall strip of the housing. Each of the secondary wall members 21 is provided at the top of its rear end piece with an opening 22 through which the rear crossbar of the lower wall strip of the housing 3 penetrates. The two secondary walls 21 serve primarily for reinforcing the box-shaped bottom portion 1.

The bath tub 2 is rotatable by the horizontal axis determined by the two plugs 20, whereby the front end portion tilts upwards and downwards. Behind the tub 2 and below the rear widening part 18, there is provided a leaf spring 28 which is positioned in front of the axis determined by the plugs 20, and which presses from the bottom towards the rear widening part 18. This retains tub 2 in a horizontal or slightly upwardly tilted position. As an alternative means of biasing, that is, instead of leaf spring 28, a float 42 may be placed below and in contact with the bottom of the tub, as shown in FIG. 6. As soon as the tub 2 is forced down by the weight of the bird, it tilts downwards until it arrives at an abutment (not shown in detail). The angle of tilt of the tub between a normal, unstressed position, and a stressed position, for example, is 10°.

In the box-like bottom portion 1 there is provided a chamber 23 at the rear and below the rearward widening part 18, which chamber is accessible via an opening in the bottom of the box-like bottom portion. This opening is blocked by means of a lid or cover 24 which, in a known manner, can be moved to an opened position and a closed position. An electric battery 25 is mounted in the chamber 23, wherein the poles of said battery are in communication with connecting points or electrical contacts 26 and 27 by means of electrical connectors as known in the art, and not shown here in detail, whereby said connecting points are provided at the upper side portion of the chamber. Contact is made between the leaf spring 29 and the upper surface of chamber 23.

Laterally to chamber 23 and also below the rearward widening part 18 there is fastened to the floor of the bottom portion 1 an electric pump means 29 by means of feet 30. This pump is cylindrically shaped, is watertight, and is provided with two connecting points or electrical contacts 31 and 32 at the upper frontal area. The pump 29 has a suction opening and a connecting piece 33 at the underside between the footings 30 (not shown in detail). To the connecting piece 33, which extends to the rear corner of the bottom portion 1, is connected a hose piece 34, which leads upwards to the housing. In the area of the housing 3, the hose piece 34 is coupled to the hose piece 7 originating at the shower head 4, by means of connecting piece 35, and is easily releasable.

Near the frontal part of bottom portion 1, between one of the lateral walls and the associated secondary wall 21, there is arranged a reed-relay 36 which closes under the effect of a magnetic field of a predetermined force a and opens at a magnetic field force b. In addition to the reed relay 36, an elongated permanent magnet 37 extending into the bottom portion and running laterally at the side of the wall of tub 2, is fastened at the top at edge bar 15 on the wall of the tub. From the reed relay 36 leads an electric wire 38 to electrical contact 26 of battery 25 and an electric wire 39 leads to the electrical contact 32 of pump 29. The two electrical contacts 27 and 31 are also connected by means of an electric wire 40. The two wires 38 and 39 are, in practice, guided near the rearward wall portion of bottom part 1, through one of the openings 22 and then between one of the secondary walls 21 and the associated wall portion of bottom part 1 to the reed relay 36.

Water is located in the box-like bottom portion 1, which is water-tight at least in the bottom half of the bottom portion. When the pump 29 is running, it draws water from the bottom portion 1 and forces it through the outlet piece 33 and the hose pieces 34 and 7 to the shower head 4. The water exits from the shower head 4 through the boreholes 6 and drops into the tub 2. From there it flows through openings 41, which are located close to the bottom of the tub in the wall portions of the same, and then again into the bottom portion 1. When the tub 2 is not forced downward by the weight of the bird, the reed relay 36 remains open and the pump 29 is inoperative. As soon as the tub 2 is tilted downwards by the weight of the bird, the permanent magnet 37 moves downwards causing the reed relay 36 to close.

In this manner, the electric cycle of battery/reed-relay/pump/battery is closed and the pump is operative, so that the shower head supplies water. When the bird leaves the tub, the latter tilts upwards, the reed-relay opens, the pump is stopped, and the water-supply from the shower head is terminated.

What is claimed is:

1. A bird-shower bath comprising a shower-head positioned over a bottom portion, said bottom portion serving as a water reservoir and being substantially open at its top to receive water from said shower-head; a movable platform adaptable to accommodate a bird and positioned in said bottom portion; a biasing means to maintain said movable platform in a rest position; an electrically operated pump positioned to receive and transfer water from said bottom portion to said shower-head; a conduit means for transferring the pumped water, connected at one end to said pump and at the other end to said shower-head; a switching means operatively connected to said pump, said switching means comprising a combination of a reed relay mounted on said bottom portion and a magnet mounted on said movable platform and being actuated by movement of said movable platform from its rest position whereby the force exerted by a bird contacting said movable platform actuates said switching means causing said pump to operate and transfer water from said bottom portion to said shower-head.

2. A bird-shower-bath as claimed in claim 1, wherein said movable platform is substantially rectangular.

3. A bird-shower-bath as claimed in claim 1, wherein said movable platform has at least one hole.

4. A bird-shower-bath as claimed in claim 1, wherein said movable platform has a configuration of a tub.

5. A bird-shower-bath as claimed in claim 4, wherein said at least one hole is located near the bottom of said tub.

6. A bird-shower-bath as claimed in claim 4, wherein said tub has an edge ridge externally positioned at the upper peripheral edge of said tub.

7. A bird-shower-bath as claimed in claim 6, wherein said edge ridge overlaps said bottom portion.

8. A bird-shower-bath as claimed in claim 1, 2, 3, 4, 5, 6 or 7 wherein said movable platform is rotationally positioned in said bottom portion.

9. A bird-shower-bath as claimed in claim 8 wherein said movable platform rotationally positioned in said bottom portion has an axis of rotation in a horizontal plane.

10. A bird-shower-bath as claimed in claim 9, wherein said axis of rotation is positioned behind said biasing means.

11. A bird-shower-bath as claimed in claim 1, wherein said pump is electrically powered.

12. A bird-shower-bath as claimed in claim 11, wherein at least one battery supplies power to said pump.

13. A bird-shower-bath as claimed in claim 12, wherein said at least one battery is contained within a water-tight chamber in said bottom portion.

14. A bird-shower-bath as claimed in claim 1, wherein said movable platform includes a profiled seating bar.

15. A bird-shower-bath as claimed in claim 1, wherein said pump is contained in said bottom portion within a water-tight chamber.

16. A bird-shower-bath as claimed in claim 1, wherein a housing is mounted on said bottom portion.

17. A bird-shower-bath as claimed in claim 16, wherein said housing has an opening in its front.

18. A bird-shower-bath as claimed in claim 16, wherein said housing is releasably mounted on said bottom portion.

19. A bird-shower-bath as claimed in claim 16, 17 or 18, wherein said shower-head is affixed to the underside of said housing.

20. A bird-shower-bath as claimed in claim 1, wherein said conduit means is a hose.

21. A bird-shower-bath as claimed in claim 20, wherein said hose is releasably connected by means of a connector located in a housing which is mounted on said bottom portion.

22. A bird-shower-bath as claimed in claim 1, wherein at least two attaching means are provided to attach said bird-shower-bath to a cage in which said bird-shower-bath is placed.

23. A bird-shower-bath as claimed in claim 22, wherein said at least two attaching means are hooks.

24. A bird-shower-bath as claimed in claim 23, wherein said hooks are affixed to a housing which is mounted on said bottom portion.

25. A bird-shower-bath as claimed in claim 24, wherein said hooks are affixed to the roof of said housing.

26. A bird-shower-bath as claimed in claims 23, 24 or 25, wherein said hooks are releasably affixed.

27. A bird-shower-bath comprising a shower-head positioned over a bottom portion, said bottom portion serving as a water reservoir and being substantially open at its top to receive water from said shower-head; a substantially rectangular movable platform adaptable to accommodate a bird and positioned in said bottom portion, said movable platform having at least one hole; a biasing means to maintain said movable platform in a rest position; an electrically operated pump positioned to receive and transfer water from said bottom portion to said shower-head; a battery supplying low voltage electrical power to said pump; a conduit means for transferring the pumped water, connected at one end to said pump and at the other end to said shower-head; a switching means operatively connected to said pump, said switching means comprising a combination of a reed relay mounted on said bottom portion and a magnet mounted on said movable platform and being actuated by movement of said movable platform from its rest position whereby the force exerted by a bird contacting said movable platform actuates said switching means causing said pump to operate and transfer water from said bottom portion to said shower-head.

28. A bird-shower-bath as claimed in claim 27, wherein said biasing means is a float placed in said water reservoir and in contact with said movable platform.

29. A bird-shower-bath as claimed in claim 1 or claim 27, wherein said biasing means is a spring.

* * * * *